(12) United States Patent
Kryzak et al.

(10) Patent No.: US 7,724,903 B1
(45) Date of Patent: May 25, 2010

(54) FRAMING OF TRANSMIT ENCODED DATA AND LINEAR FEEDBACK SHIFTING

(75) Inventors: Joseph Neil Kryzak, San Jose, CA (US); Aaron J. Hoelscher, Ankeny, IA (US)

(73) Assignee: XILINX, Inc., San Jose, CA (US)

( * ) Notice: Subject to any disclaimer, the term of this patent is extended or adjusted under 35 U.S.C. 154(b) by 252 days.

(21) Appl. No.: 12/052,699

(22) Filed: Mar. 20, 2008

Related U.S. Application Data

(62) Division of application No. 10/659,979, filed on Sep. 11, 2003, now Pat. No. 7,362,864.

(51) Int. Cl.
 H04L 9/00 (2006.01)
 H04K 1/00 (2006.01)
(52) U.S. Cl. .................. 380/265; 380/259; 380/255
(58) Field of Classification Search ................ 380/265, 380/259, 255
 See application file for complete search history.

(56) References Cited

U.S. PATENT DOCUMENTS

| | | | |
|---|---|---|---|
| 4,667,305 | A | 5/1987 | Dill et al. |
| 5,561,714 | A | 10/1996 | Hershberger |
| 5,659,718 | A | 8/1997 | Osman et al. |
| 6,812,870 | B1 | 11/2004 | Kryzak et al. |
| 6,870,390 | B1 | 3/2005 | Groen et al. |
| 6,908,340 | B1 | 6/2005 | Shafer |
| 6,956,442 | B2 | 10/2005 | Groen et al. |
| 6,975,132 | B2 | 12/2005 | Groen et al. |
| 6,976,102 | B1 | 12/2005 | Groen et al. |
| 6,995,618 | B1 | 2/2006 | Boecker |
| 7,015,838 | B1 | 3/2006 | Groen et al. |

(Continued)

FOREIGN PATENT DOCUMENTS

EP 1 133 124 A2 9/2001

OTHER PUBLICATIONS

From Hardware to Software Synthesis of Linear Feedback Shift Registers; Lauradoux, C.; Parallel and Distributed Processing Symposium, 2007. IPDPS 2007. IEEE International Mar. 26-30, 2007 pp. 1-8.*

(Continued)

*Primary Examiner*—David Y Jung
(74) *Attorney, Agent, or Firm*—Timothy W. Markison; LeRoy D. Maunu

(57) ABSTRACT

Framing transmit encoded output data begins by determining a scrambling remainder between scrambling of an input code word in accordance with a $1^{st}$ scrambling protocol and the scrambling of the input code word in accordance with an adjustable scrambling protocol. The processing continues by adjusting the adjustable scrambling protocol based on the scrambling remainder to produce an adjusted scrambling protocol. The processing then continues by scrambling the input code word in accordance with the $1^{st}$ scrambling protocol to produce a $1^{st}$ scrambled code word. The processing continues by scrambling the input code word in accordance with the adjusted scrambling protocol to produce a scrambled partial code word. The processing continues by determining a portion of the $1^{st}$ scrambled code word based on the scrambling remainder. The process then continues by combining the scrambled partial code word with the portion of the $1^{st}$ scrambled code word to produce the transmit encoded output data.

9 Claims, 10 Drawing Sheets

U.S. PATENT DOCUMENTS

| | | |
|---|---|---|
| 7,047,457 B1 | 5/2006 | Black et al. |
| 7,073,148 B1 | 7/2006 | Jenkins |
| 7,092,689 B1 | 8/2006 | Boecker et al. |
| 7,109,809 B1 | 9/2006 | Groen et al. |
| 7,188,283 B1 | 3/2007 | Shafer et al. |
| 7,224,951 B1 | 5/2007 | Chuang et al. |
| 7,280,590 B1 | 10/2007 | Boecker et al. |
| 7,313,176 B1 | 12/2007 | Groen |

OTHER PUBLICATIONS

Hu, B., et al., "Key Distribution Scheme Based On Two Cryptosystems For Hierarchical Access Control", Advanced Communication Technology, 2006, ICACT 2006, the $8^{th}$ International Conference, vol. 3, Feb. 20-22, 2006.

Kanjanarin, W., et al., Scrambling and Key Distribution Scheme For Digital Television, Networks, 2001, Proceedings, Ninth IEEE International Conference on Oct. 10-12, 2001, pp. 140-145.

Lian, S., et al. "A Fast Video Encryption Scheme Suitable For Network Applications", Communications, Circuits and Systems, 2004 ICCCAS 2004. 2004 International Conference on vol. 1, Jun. 27-29, 2004, pp. 566-570.

Samarakoon, M.I., et al., "Encrypted video Over TETRA", Tetra Market and Technology Developments (Ref. No. 2000/007), IEE Seminar on Feb. 10, 2000, pp. 3/1-3/5.

Schonberg, D., et al., "On Compression of Encrypted Video", Data Compression Conference, 2007, DCC07, Mar. 27-29, 2007, pp. 173-182.

U.S. Appl. No. 10/660,449, filed Sep. 11, 2003, Cory et al., "Variable Latency Buffer and Method of Operation", Xilinx Inc, 2100 Logic Drive, San Jose, California 95124.

U.S. Appl. No. 10/659,803, filed Sep. 11, 2003, Black et al., "Analog Front-End Having Built-In Equalization and Applications Thereof", Xilinx Inc, 2100 Logic Drive, San Jose, California 95124.

U.S. Appl. No. 10/660,254, filed Sep. 11, 2003, Groen et al., "MGT/FPGA Clock Management System", Xilinx Inc, 2100 Logic Drive, San Jose, California 95124.

U.S. Appl. No. 10/661,016, filed Sep. 11, 2003, Groen et al., "Programmable Logic Device Including Programmable Multi-Gigabit Transceivers", Xilinx Inc, 2100 Logic Drive, San Jose, California 95124.

U.S. Appl. No. 10/659,974, filed Sep. 11, 2003, Kryzak et al., "Channel Bonding of a Plurality of Multi-Gigabit Transceivers", Xilinx Inc, 2100 Logic Drive, San Jose, California 95124.

U.S. Appl. No. 10/659,979, filed Sep. 11, 2003, Kryzak et al., "Framing of Transmit Encoded Data and Linear Feedback Shifting", Xilinx Inc, 2100 Logic Drive, San Jose, California 95124.

* cited by examiner programmable logic device 10 programmable MGT 14 - 28 programmable receive PCS module 44 programmable transmit PCS module 42 framing encoded data example of framing data example of framing data
(continued)

framing decoded data

FRAMING OF TRANSMIT ENCODED DATA AND LINEAR FEEDBACK SHIFTING

BACKGROUND OF THE INVENTION

1. Technical Field of the Invention

This invention relates generally to communication systems and more particularly to encoding/decoding and scrambling/descrambling of data within such communication systems.

2. Description of Related Art

Communication systems are known to transport large amounts of data between a plurality of end user devices. Such end user devices include telephones, facsimile machines, computers, television sets, cellular phones, personal digital assistants, et cetera. As is also known, such communication systems may be local area networks (LAN) and/or wide area networks (WAN). A local area network is generally understood to be a network that interconnects a plurality of end user devices distributed over a localized area (e.g., up to a radius of 10 kilometers). For example, a local area network may be used to interconnect workstations distributed within an office of a single building or a group of buildings, to interconnect Internet computer based equipment distributed around a factory or hospital, et cetera.

A wide area network is generally understood to be a network that covers a wide geographic area. Wide area networks include both public data networks and enterprise wide private data networks. A public data network is established and operated by a national network administrator specifically for data transmission. Such public data networks facilitate the interworkings of equipment from different manufacturers. Accordingly, standards by the ITU-T have been established for conveying data within public data networks. Currently, there are two main types of public data networks: packet switched public data networks and circuit switched public data networks. For example, the public switched telephone network is a circuit switched public data network while the Internet is a packet switched public data network. Other examples of wide area networks include integrated service digital networks (ISDN) and broadband multi-service networks.

As is further known, communication systems may be networked together to yield larger communication systems, where such networking is typically referred to as internetworking. Internetworking is achieved via internetworking units that allow communication networks using the same or different protocols to be linked together. The internetworking units may be routers, gateways, protocol converters, bridges, and/or switches.

Regardless of the type of communication system (e.g., LAN, WAN, internetworking LAN and/or WAN), each communication system employs a data conveyance protocol to ensure that data is accurately conveyed within the system. All such data conveyance protocols are based on layers 1, 2, 3, and/or 4 of the open system interconnection (OSI) seven layer reference model. As is known, the layers include a physical layer (layer 1), a data link layer (layer 2), a network layer (layer 3), a transport layer (layer 4), a session layer (layer 5), a presentation layer (layer 6), and an application layer (layer 7).

In general, a protocol is a formal set of rules and conventions that govern how each end user device and/or data terminal equipment (i.e., the infrastructure equipment of the communication system) exchanges information within the communication system. A wide variety of protocols exist, but can generally be categorized in the one of four types of protocols: a local area network protocol, a wide area network protocol, a routing protocol, or a network protocol. Local area network protocols operate at the physical and data link layers and define communication over various local area network and media. Wide area network protocols operate at the lowest three layers of the OSI model and define communication over the various wide area media. Routing protocols are network layer protocols that are responsible for path determination and traffic switching. Network protocols are the various upper layer protocols that exist in a given protocol suite. Examples of such protocols include asynchronous transfer mode (ATM), frame relay, TCP/IP, Ethernet, et cetera. Typically, such protocols include an encoding/decoding and/or scrambling/descrambling scheme. As is known, an encoding/decoding scheme enhances the reliability of data conveyances by encoding and/or scrambling data to include extra bits with the data to produce a code word. When the code word is received by the corresponding decoder and/or descrambler, it utilizes the extra bits to determine if the data was received without error. If the data was received without error, the decoder and/or descrambler uses the extra bits to determine and subsequently correct the error.

One such coding scheme is 64b/66b, which takes 64 bits of data and produces a 66-bit code word. In addition, the 66-bit code word is scrambled to produce a scrambled 66-bit code word. The scrambled 66-bit code word includes a 2-bit sync-header and 64 bits of scrambled encoded data. An issue arises in transmitting and subsequently receiving the scrambled 66-bit code word in that most data buses are 32-bits wide. Thus, every 2 cycles, there are 2 bits leftover, which need to be transmitted during the $3^{rd}$ cycle.

The current solution to resolve this issue is to use a barrel shifter gearbox. While the barrel shifter works, it is very large with respect to die area and consumes a significant amount of power. For instance, a barrel shifter for a 32-bit bus requires 16×66 registers to store and transfer the scrambled 66-bit code words. The 66 value corresponds to the number of bits in a scrambled code word and the 16 value corresponds to the pattern of the 2 leftover bits repeating every 16 cycles (e.g., 32 bit bus divided by 2 extra bits).

Therefore, a need exists for a method and apparatus for framing code words without the need for a barrel shifter.

BRIEF SUMMARY OF THE INVENTION

The framing of transmit encoded data and linear feedback shifting of the present invention substantially meets these needs and others. In one embodiment, a transmit code word is framed by determining a scrambling remainder between scrambling of an input code word in accordance with a $1^{st}$ scrambling protocol and the scrambling of the input code word in accordance with an adjustable scrambling protocol. The processing continues by adjusting the adjustable scrambling protocol based on the scrambling remainder to produce an adjusted scrambling protocol. The processing then continues by scrambling the input code word in accordance with the $1^{st}$ scrambling protocol to produce a $1^{st}$ scrambled code word. The processing continues by scrambling the input code word in accordance with the adjusted scrambling protocol to produce a scrambled partial code word. The processing continues by determining a portion of the $1^{st}$ scrambled code word based on the scrambling remainder. The process then continues by combining the scrambled partial code word with the portion of the $1^{st}$ scrambled code word to produce the transmit code word. With such a method, encoded data, i.e., code words, may be scrambled without the need for a barrel shifter by utilizing the adjustable scrambling protocol in combination with the $1^{st}$ scrambling protocol.

In another embodiment, a method for linear feedback shifting begins by receiving an N+m input code word, where N-bits of the N+m bit input code word corresponds to data and m bits of the N+m input code word corresponds to header information. The processing continues by performing a $1^{st}$ linear feedback shift operation on N-bits of the N+m bit input code word to produce an N-bit shifted code word. The processing continues by processing the N+m bit input code word in accordance with a $2^{nd}$ linear feedback operation to maintain the m bits of the input code word and to produce an N-(m*k) bit shifted code word, where k corresponds to a shift offset. The processing then continues by producing an N bit shifted output code word based on the N-(m*k) bit shifted code word and bits [0, (N/2−(m*k)−1)] of the N bit shifted code word. With such a method, a N+m bit code word may be shifted without the need for a barrel shifter thus considerably reducing die area requirements and power consumption.

DETAILED DESCRIPTION OF THE INVENTION

Figure 1:
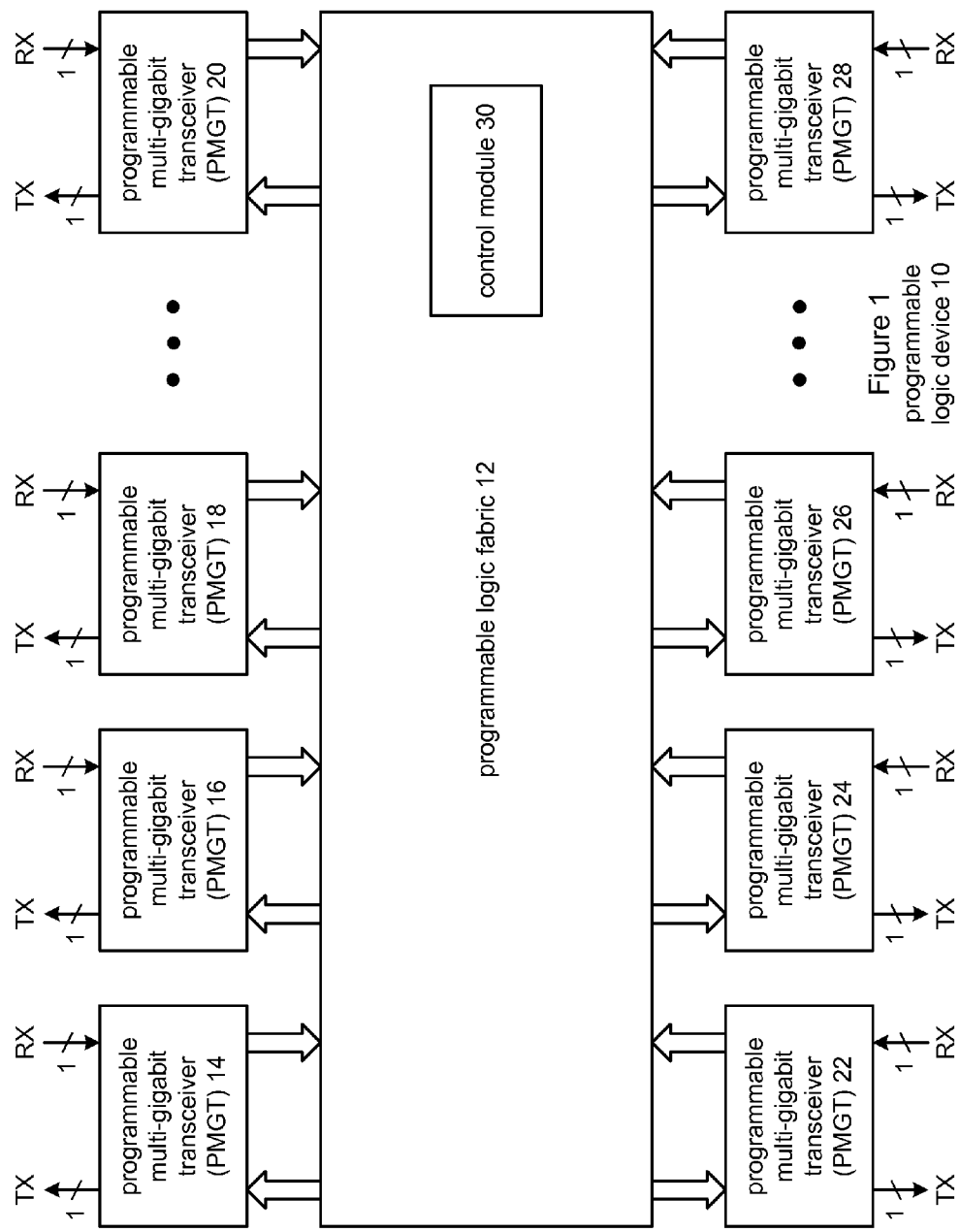
FIG. 1 is a schematic block diagram of a programmable logic device in accordance with the present invention.

FIG. 1 is a schematic block diagram of a programmable logic device 10 that includes programmable logic fabric 12, a plurality of programmable multi-gigabit transceivers (PMGT) 14-28 and a control module 30. The programmable logic device 10 may be, for instance, a programmable logic array device, a programmable array logic device, an erasable programmable logic device, and/or a field programmable gate array (FPGA). When the programmable logic device 10 is a field programmable gate array (FPGA), the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by a programmable logic device 10.

The control module 30 may be contained within the programmable logic fabric 12 or it may be a separate module. In either implementation, the control module 30 generates the control signals to program each of the transmit and receive sections of the programmable multi-gigabit transceivers 14-28. In general, each of the programmable multi-gigabit transceivers 14-28 performs a serial-to-parallel conversion on receive data and performs a parallel-to-serial conversion on transmit data. The parallel data may be 8-bits, 16-bits, 32-bits, 64-bits, et cetera wide. Typically, the serial data will be a 1-bit stream of data that may be a binary level signal, multi-level signal, etc. Further, two or more programmable multi-gigabit transceivers may be bonded together to provide greater transmitting speeds. For example, if multi-gigabit transceivers 14, 16 and 18 are transceiving data at 3.125 gigabits-per-second, the transceivers 14-18 may be bonded together such that the effective serial rate is 3 times 3.125 gigabits-per-second.

Each of the programmable multi-gigabit transceivers 14-28 may be individually programmed to conform to separate standards. In addition, the transmit path and receive path of each multi-gigabit transceiver 14-28 may be separately programmed such that the transmit path of a transceiver is supporting one standard while the receive path of the same transceiver is supporting a different standard. Further, the serial rates of the transmit path and receive path may be programmed from 1 gigabit-per-second to tens of gigabits-per-second. The size of the parallel data in the transmit and receive sections, or paths, is also programmable and may vary from 8-bits, 16-bits, 32-bits, 64-bits, et cetera.

Figure 2:
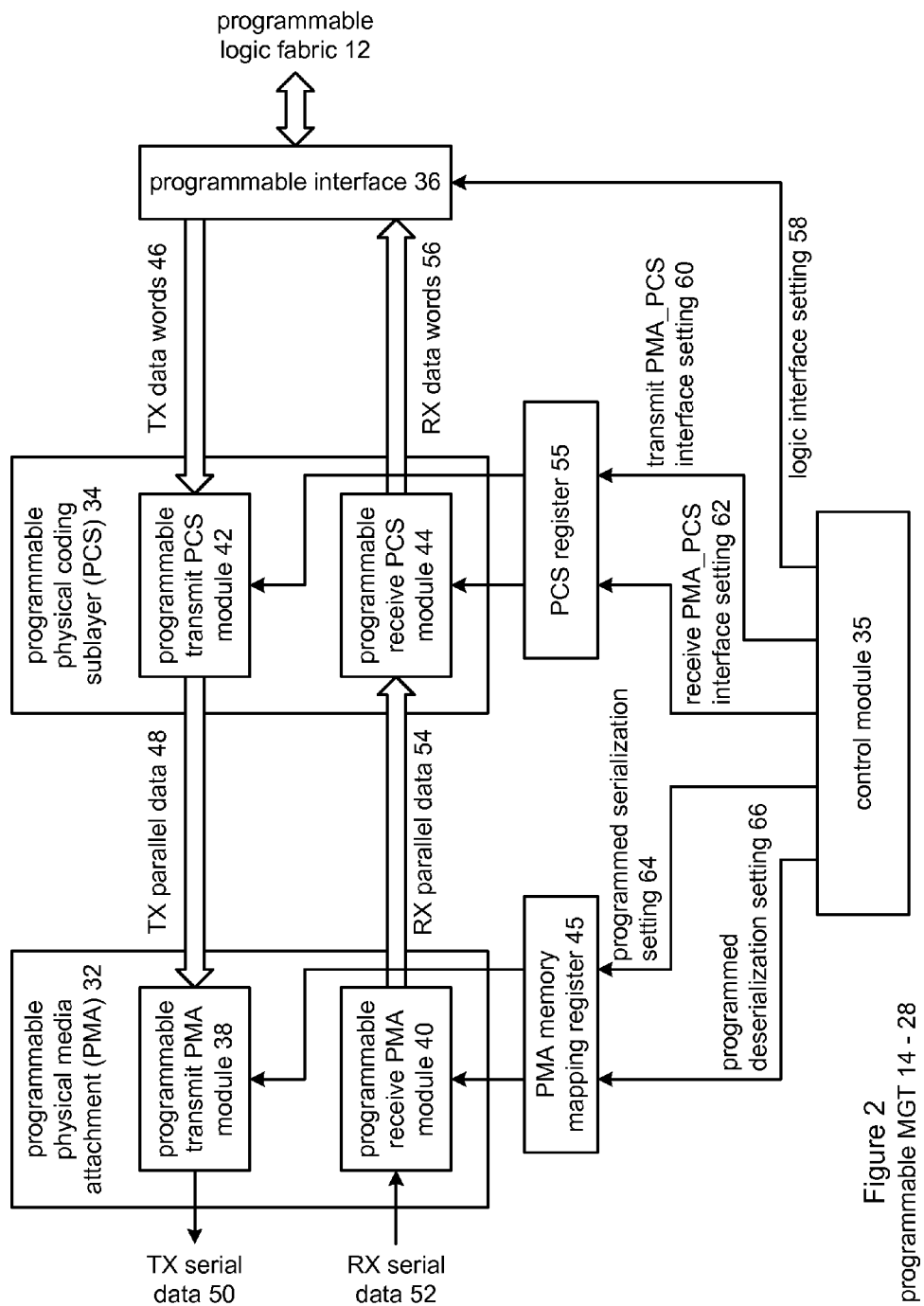
FIG. 2 is a schematic block diagram of a programmable multi-gigabit transceiver in accordance with the present invention.

FIG. 2 is a schematic block diagram of one embodiment of a representative one of the programmable multi-gigabit transceivers 14-28. As shown, the programmable multi-gigabit transceiver includes a programmable physical media attachment (PMA) module 32, a programmable physical coding sub-layer (PCS) module 34, a programmable interface 36, a control module 35, a PMA memory mapping register 45 and a PCS register 55. The control module 35, based on the desired mode of operation for the individual programmable multi-gigabit transceiver 14-28, generates a programmed deserialization setting 66, a programmed serialization setting 64, a receive PMA_PCS interface setting 62, a transmit PMA_PCS interface setting 60, and a logic interface setting 58. The control module 35 may be a separate device within each of the multi-gigabit transceivers and/or included within the control module 30. In either embodiment of the PMGT control module 35, the programmable logic device control module 30 determines the corresponding overall desired operating conditions for the programmable logic device 10 and provides the corresponding operating parameters for a given multi-gigabit transceiver to its control module 35, which generates the settings 58-66.

The programmable physical media attachment (PMA) module 32 includes a programmable transmit PMA module 38 and a programmable receive PMA module 40. The programmable transmit PMA module 38 is operably coupled to convert transmit parallel data 48 into transmit serial data 50 in accordance with the programmed serialization setting 64. The programmed serialization setting 64 indicates the desired rate of the transmit serial data 50, the desired rate of the transmit parallel data 48, and the data width of the transmit parallel data 48. The programmable receive PMA module 40 is operably coupled to convert receive serial data 52 into receive parallel data 54 based on the programmed deserialization setting 66. The programmed deserialization setting 66 indicates the rate of the receive serial data 52, the desired rate of the receive parallel data 54, and the data width of the receive parallel data 54. The PMA memory mapping register 45 may store the serialization setting 64 and the deserialization setting 66.

The programmable physical coding sub-layer (PCS) module 34 includes a programmable transmit PCS module 42 and a programmable receive PCS module 44. The programmable transmit PCS module 42, which will be described in greater detail with reference to FIG. 4, receives transmit data words 46 from the programmable logic fabric 12 via the programmable interface 36 and converts them into the transmit parallel data 48 in accordance with the transmit PMA_PCS interface setting 60. The transmit PMA_PCS interface setting 60 indicates the rate of the transmit data words 46, the size of the transmit data words (e.g., 1-byte, 2-bytes, 3-bytes, 4-bytes, et cetera) and the corresponding transmission rate of the transmit parallel data 48. The programmable receive PCS module 44, which will be described in greater detail with reference to FIG. 3, converts the receive parallel data 54 into receive data words 56 in accordance with the receive PMA_PCS interface setting 62. The receive PMA_PCS interface setting 62 indicates the rate at which the receive parallel data 54 will be received, the width of the parallel data 54, the transmit rate of the receive data words 56 and the word size of the receive data words 56.

The control module 35 also generates the logic interface setting 58 that provides the rates at which the transmit data words 46 and receive data words 56 will be transceived with the programmable logic fabric 12. Note that the transmit data words 46 may be received from the programmable logic fabric 12 at a different rate than the receive data words 56 are provided to the programmable logic fabric 12.

As one of average skill in the art will appreciate, each of the modules within the PMA module 32 and PCS module 34 may be individually programmed to support a desired data transfer rate. The data transfer rate may be in accordance with a particular standard such that the receive path, i.e., the programmable receive PMA module 40 and the programmable receive PCS module 44 may be programmed in accordance with one standard while the transmit path, i.e., the programmable transmit PCS module 42 and the programmable transmit PMA module 38 may be programmed in accordance with another standard.

Figure 3:
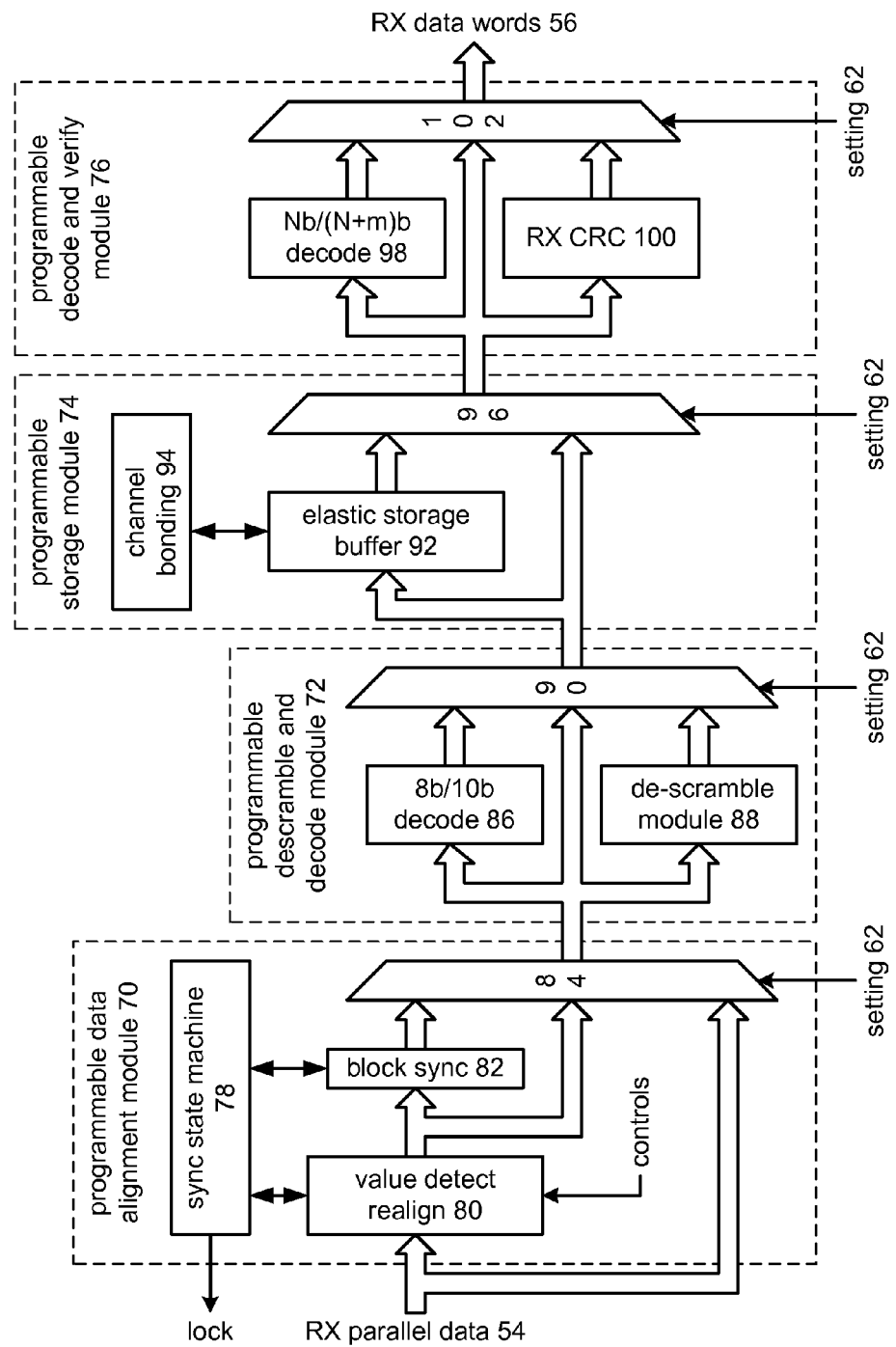
FIG. 3 is a schematic block diagram of a programmable receive physical coding sub-layer (PCS) module in accordance with the present invention.

FIG. 3 is a schematic block diagram of a programmable receive PCS module 44 that includes a programmable data alignment module 70, a programmable descramble and decode module 72, a programmable storage module 74, and a programmable decode and verify module 76. The programmable data alignment module 70 includes a synchronous state machine 78, a value detect realign module 80, a block synchronization module 82, and a multiplexer 84. The programmable descramble and decode module 72 includes a 64b/66b descrambling module 88, an 8b/10b decoding module 86 and a multiplexer 90. The programmable storage module 74 includes a channel bonding module 94, an elastic storage buffer 92 and a multiplexer 96. The programmable decode and verify module 76 includes a receiver CRC (cyclic redundancy check) module 100, a 64b/66b decoding module 98, and a multiplexer 102.

In operation, the programmable data alignment module 70 receives the receive parallel data 54. Based on the receive PMA_PCS interface setting 62, the receive parallel data 54 may be passed via multiplexer 84 without processing, may be processed by the value detect realign module 80 and then passed via multiplexer 84 and/or further processed via the block synchronization module 82. As such, the setting 62 may bypass the programmable data align module 70, perform a value detection realignment and pass the realigned data and/or further utilize block synchronization, which is typically used for 10 gigabits-per-second signaling. The synchronization state machine 78 coordinates the alignment of the receive parallel data 54 via the value detect realign 80 and the block synchronization module 82. In addition, once the value detect realignment module 80 indicates that the data is valid and the block synchronization module 82 indicates that the PCS module is now in sync with the receive parallel data 54, the sync state machine 78 generates a lock signal.

The controls of the value detect realign module 80 include receive polarity of the signal, alignment information, et cetera.

The programmable descramble and decode module 72 receives the output of multiplexer 84 and, based on setting 62, either passes the data via multiplexer 90, descrambles it via the 64b/66b descrambler 88, or decodes it via the 8b/10b decode module 86. The 64b/66b descrambling module 88 will be described in greater detail with reference to FIG. 8. The 8b/10b decoding module 186 may be further described in co-pending U.S. Pat. No. 7,280,590 issued Oct. 9, 2007, by Kryzak et al. entitled "Enhanced 8B/10B Encoding/Decoding and Applications Thereof."

The programmable storage module 74 may buffer the data it receives from multiplexer 90 via the elastic store buffer 92 to facilitate channel bonding or pass the data directly to multiplexer 96. The channel bonding module 94 enables the receiver of one programmable multi-gigabit transceiver to be linked or bonded with one or more other receivers within another multi-gigabit transceiver to increase the effective serial data rate.

The programmable decode and verify module 76 receives the output of multiplexer 96 and passes it directly as the receive data word 56 in accordance with setting 62, processes the data via a receive CRC module 100 and provides that as the output, or decodes it via the 64b/66b decoding module 98. The 64b/66b decode module 98 is described in greater detail with reference to FIG. 8.

As one of average skill in the art will appreciate, the programmable receive PCS module 44 is readily programmable via settings 62 (which may control multiplexers 84, 90, 96, and 102) to decode the receive parallel data 54 using a variety of decoding schemes, to process channel bonding, to verify and lock the incoming data, et cetera, thereby enabling compatibility with various standards.

Figure 4:
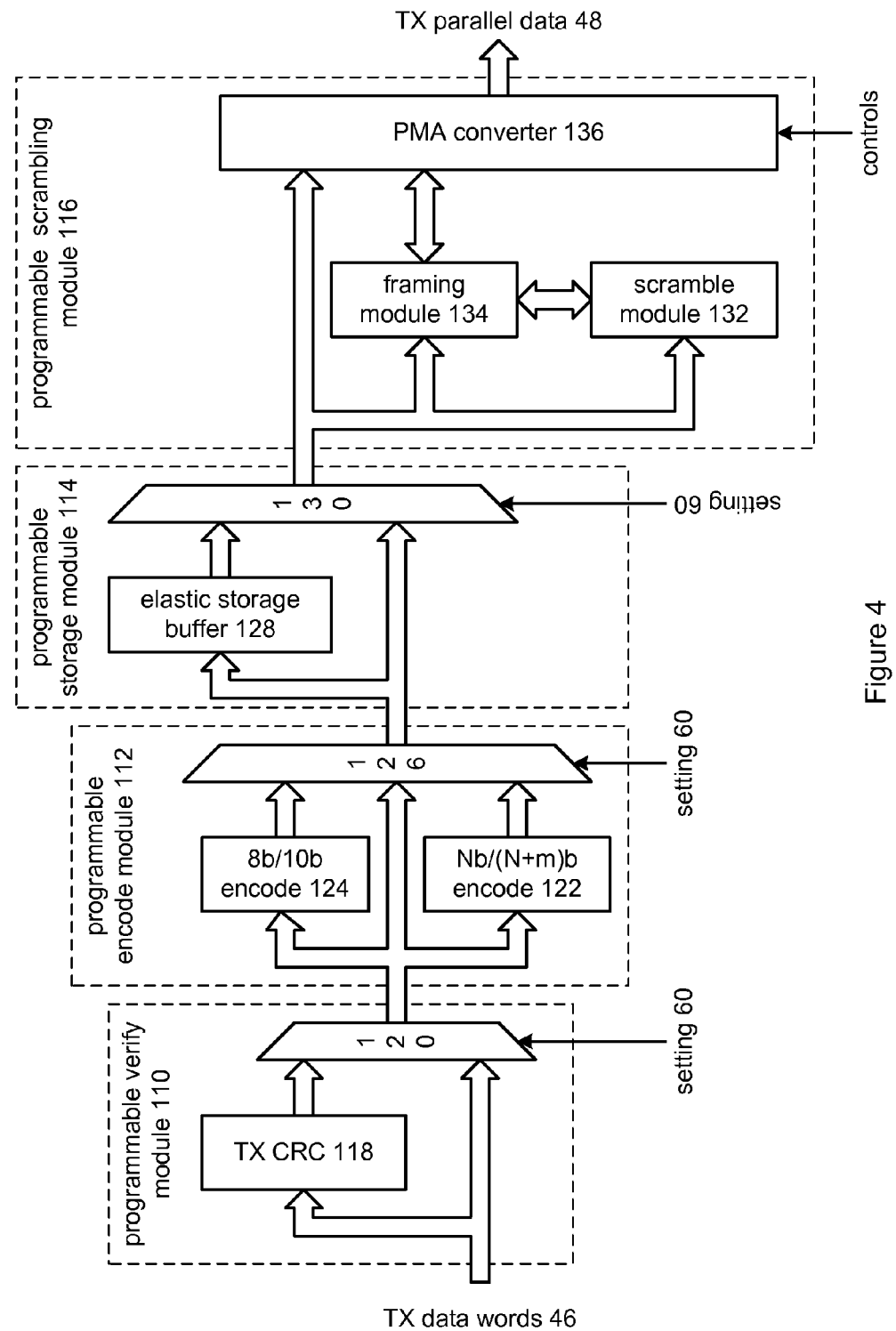
FIG. 4 is a schematic block diagram of a programmable transmit physical coding sub-layer (PCS) module in accordance with the present invention.

FIG. 4 is a schematic block diagram of the programmable transmit PCS module 42 that includes a programmable verify module 110, a programmable encode module 112, a programmable storage module 114, and a programmable scramble module 116. The programmable verify module 110 includes a transmit CRC module 118 and a multiplexer 120. The programmable encode module 112 includes a 64b/66b encoding module 122, an 8b/10b encoding module 124, and a multiplexer 126. The programmable storage module 114 includes an elastic storage buffer 128 and a multiplexer 130. The programmable scramble module 116 includes a scramble module 132, a framing module 134, and a PMA converter 136.

The programmable verify module 110 is operably coupled to receive the transmit data words 46 and either pass them directly to the programmable encoding module 112 or perform a cyclic redundancy check upon them. The transmit PMA_PCS interface setting 60 indicates whether the transmit data words 46 will be directly passed to the programmable encode module 112 or be subject to a cyclic redundancy check. The programmable encoding module 112, based on setting 60, either encodes the data received from the programmable verify module 110 via the 8b/10b encoder 124, the 64b/66b encoder 122 or passes the data directly to the programmable storage module 114. The 64b/66b encoder 122 is described in greater detail with reference to FIGS. 5-7. The 8b/10b encoder 224 is more fully described in co-pending U.S. Pat. No. 6,812,870, issued Nov. 2, 2004, by Boecker et al., entitled "Receiver Termination Network and Application Thereof."

The programmable storage module 114, based on setting 60, either passes the data that it receives from the programmable encode module 112 or stores it in the elastic storage buffer 128. The elastic storage buffer 128 allows for differing time rates between the transmit data words 46 and the transmit parallel data 48. For example, if the transmit data words 46 are 1-byte words at a rate of 500 megahertz and the transmit parallel data 48 is 2-bytes width at 300 megahertz, the data-per-cycle rate is different between the transmit data words 46 and the transmit parallel data 48. Accordingly, the elastic storage buffer 128 allows for data to accumulate in the elastic storage buffer and thus accommodate the differing data-per-rate discrepancies between the transmit data words 46 and the transmit parallel data 48.

The programmable scramble module 116 receives the output of multiplexer 130 and either passes it directly to the PMA converter 136 to produce the transmit parallel data 48 based on control signals or scrambles the data via the scramble module 132 and the framing module 134. The controls for the PMA converter 136 include polarity of the parallel data 48 and an indication of which path the data will be received from. The scramble module 132 and framing module 134 will be further described with reference to FIGS. 5-7.

As one of average skill in the art will appreciate, the programmable transmit PCS module 42 may be programmed in a variety of ways to directly pass the transmit data words 46, encode them, scramble them, buffer them, et cetera. As such, with a wide diversity in programming abilities, the programmable transmit PCS module 42, as well as the entire programmable multi-gigabit transceiver, may be programmed in accordance with many standards.

Figure 5:
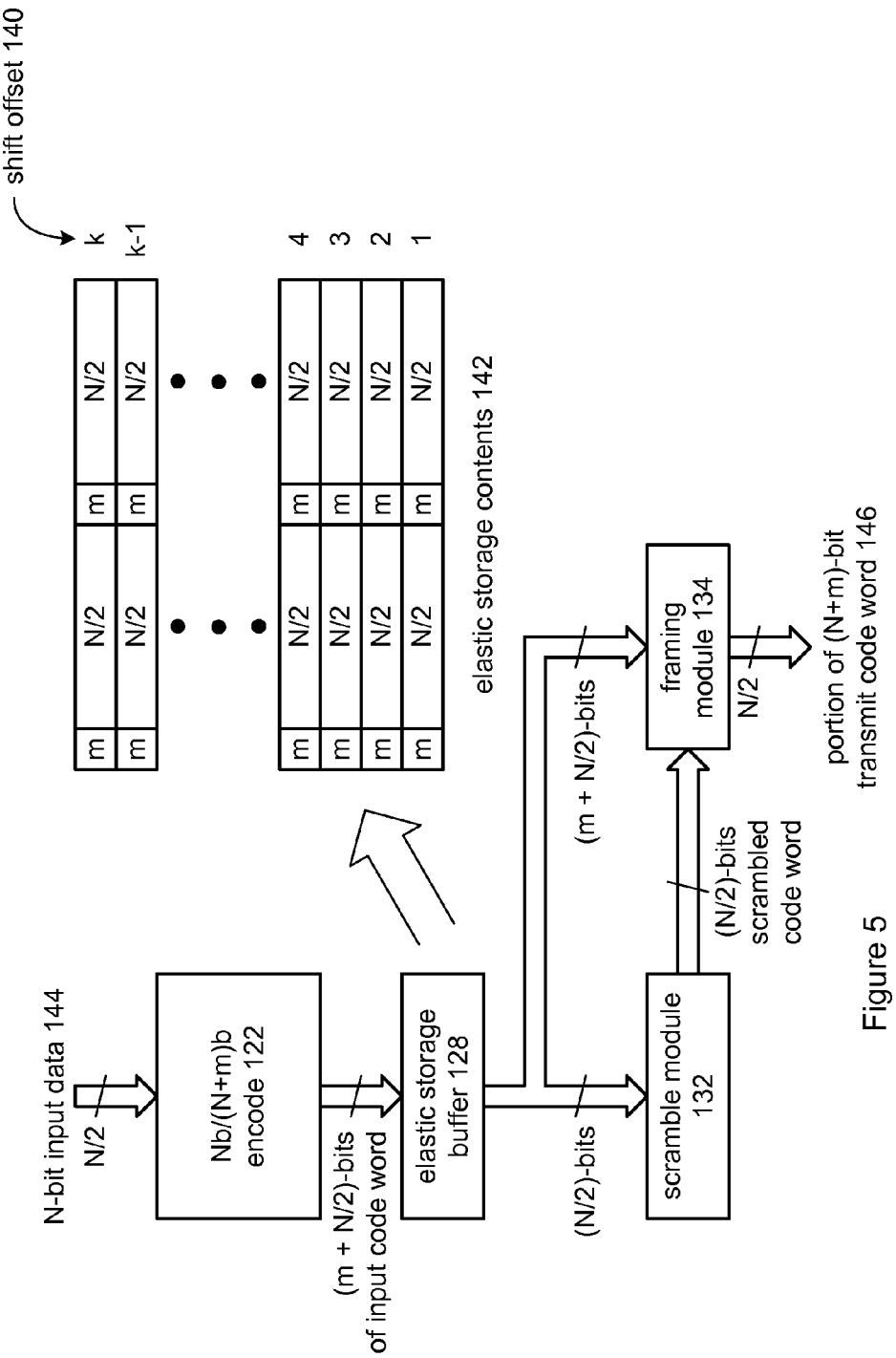
FIG. 5 is a graphic example of framing encoded data in accordance with the present invention.

FIG. 5 is a diagram depicting framing of encoded data in accordance with the present invention. The framing process is implemented via an Nb/(N+m)b encoder 122, an elastic storage buffer 128, a scrambling module 132 and a framing (or gearbox) module 134. For instance, in one embodiment, N may be 64 and m may be 2, and, thus, the Nb/(N+m)b encoder 122 may be a 64b/66b encoder. In other embodiments, Nb/(N+m)b encoder 122 may be a 64b/(64+m)b encoder, where m is 3 or more.

In operation, the Nb/(N+m)b encoder 122 receives N-bit input data 144 via a bus that has a bus width of N/2. For example, if the N-bit input data 144 corresponds to 64 bit data then the N/2 bus will be a 32-bit bus. The encoder 122 encodes the N-bit input data 144 to produce (m+N/2) bits of the input code word during a processing cycle. A processing cycle may include one or more clock cycles. Thus, every 2 processing intervals, the encoder 122 outputs a complete input code word. For 64b/66b encoding and an input bus of 32 bits, the encoder 122 outputs a 66-bit code word every two processing intervals.

The elastic storage buffer 128 stores the (m+N/2) bits (e.g., 34 bits for 64b/66b encoding) of the input code word. As shown, the elastic storage contents 142 includes a plurality of lines of memory, where each line of the elastic storage buffer 128 includes 2 sections; each storing m+N/2 bits of information. For 64b/66b encoding, the elastic storage contents 142 include the 66-bit encoded code word. In this instance, the m-bits in the first section of a line (i.e., the left section) correspond to the sync-header and the N/2 bits store the first 32-bits of a 66-bit code word. The m-bits of the second section of a line contains null (or don't care) information and the N/2 bits of the second section store the second 32-bits of the 66-bit code word.

As is also shown, each line of the elastic storage contents 142 has a corresponding shift offset 140. The shift offset (k) is an integer value in the range of 1 to N/2m. For example, for a 66-bit encoded code word, N is 64 and m is 2 such that the shift offset range is 1 to 16. The shift offset is used by the framing module 134 to determine how much of the incoming code word it will process to produce its corresponding output. This will be described in greater detail with reference to FIGS. 6 and 7.

The scramble module 132 receives N/2 bits of the input code word and scrambles them to produce an N/2 bits scrambled code word. The scrambling module 132 may be a linear feedback shift register that executes a generator polynomial to produce the scrambled code word. For 64b/66b encoding the polynomial may correspond to $G(X)=1+X^{39}+X^{58}$.

The framing module 134 receives m+N/2 bits of the input code word per processing interval and outputs N/2 bits of information. For example, if the process is for 64b/66b encoding the framing module receives 34 bits of information and outputs 32 bits of encoded information. The framing module 134 also receives the N/2 bit scrambled code word from the scramble module 132. Based on the internal scrambling performed by the framing module 134, the shift offset (k), and the N/2 bits scrambled code word received from scramble module 132, the framing module 134 produces a portion of the N+m bit transmit code word 146.

Figure 6:
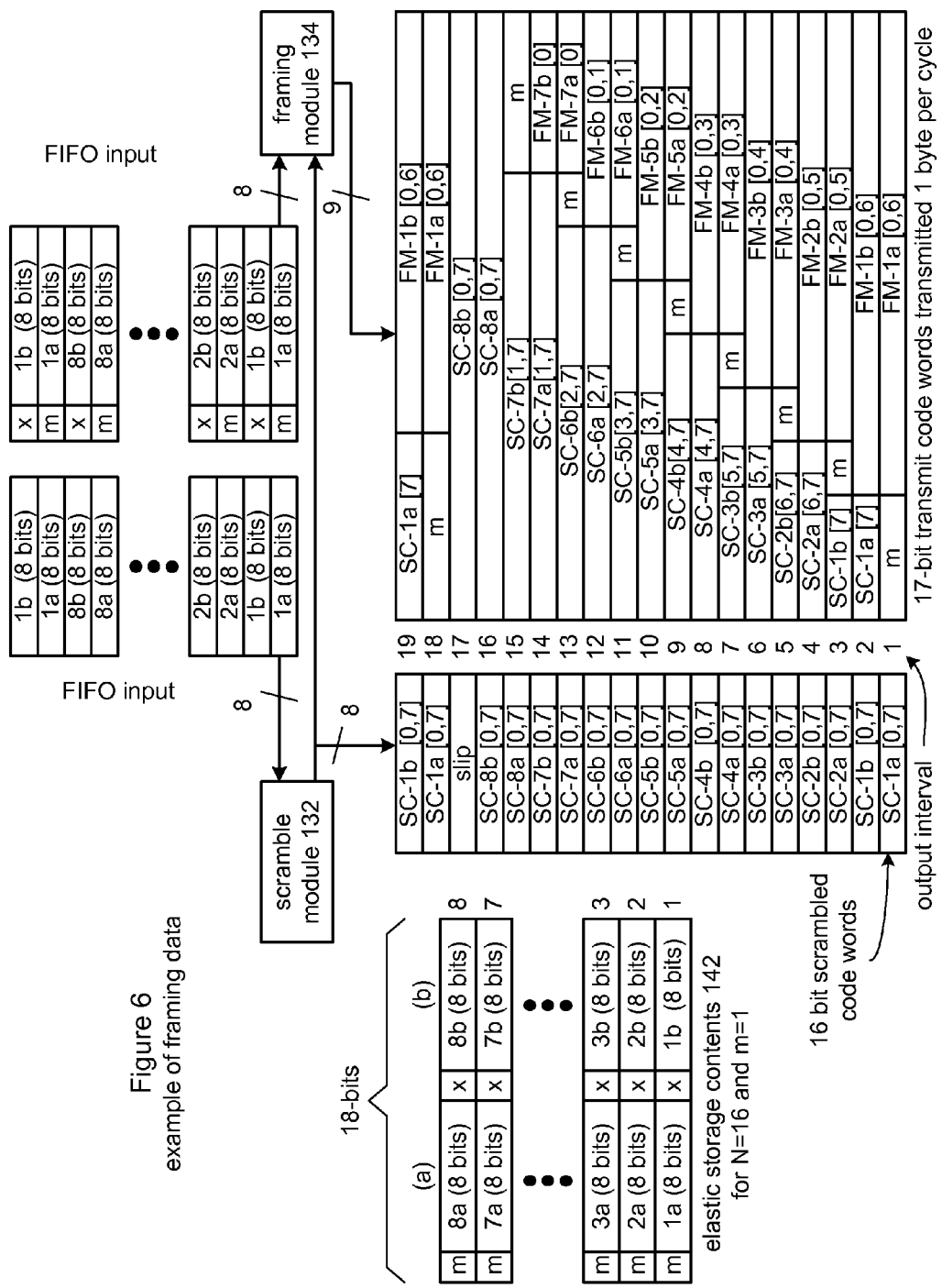
FIG. 6 is a further example of framing data in accordance with the present invention.
Figure 8:
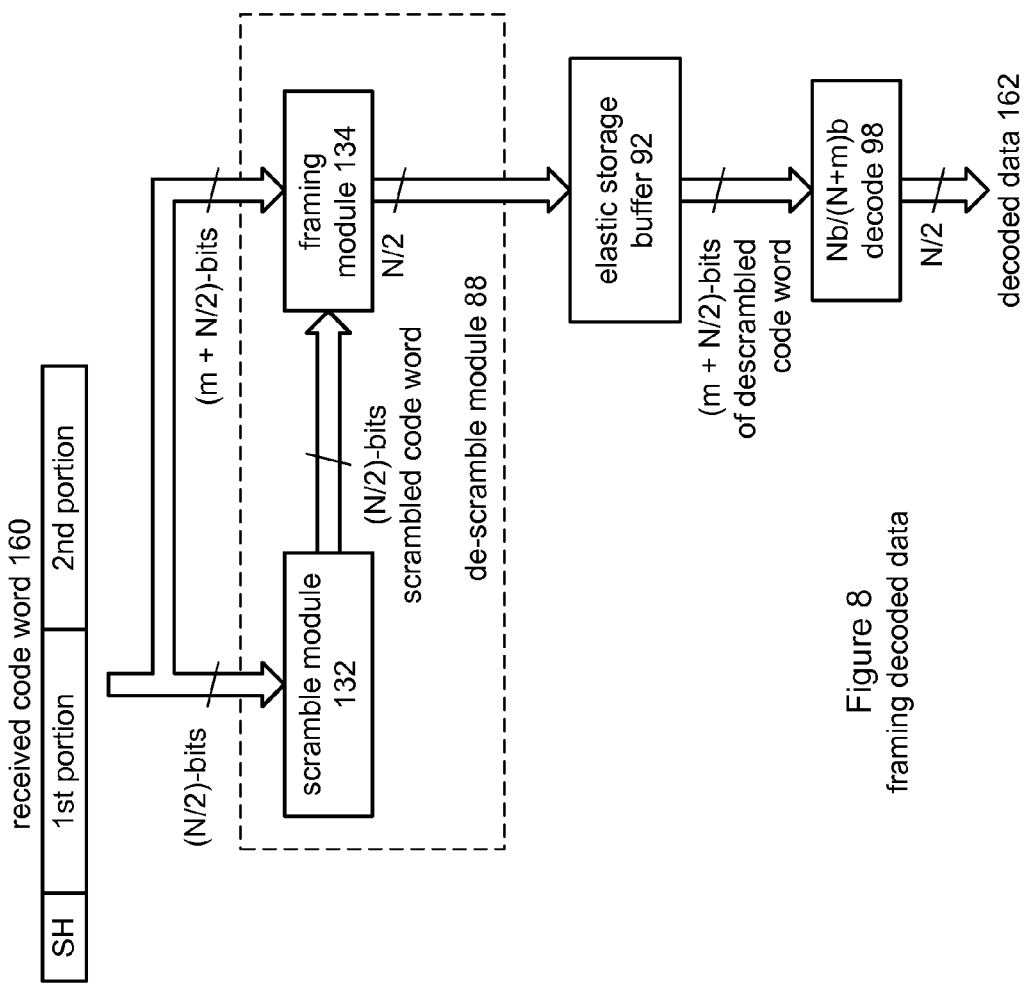
FIG. 8 is a diagram depicting framing decoded data in accordance with the present invention.

FIG. 6 illustrates an example of framing data as may be performed by the circuit of FIG. 5 and/or the circuit of FIG. 8. In this example, the resulting code word is 18-bits, 16 bits of which correspond to encoded data, 1 bit for a sync-header and 1 bit of don't-care data. Accordingly, for this example, the elastic storage content 142 includes a plurality of 18 bit lines for codes words having N=16, and m=1. With N=16 and m=1, the shift offset is in the range of 1 to 8 (i.e., 1 to N/2m, which is 1 to 16/(2*1)=1 to 8). As shown, the $1^{st}$ line of the elastic storage (i.e., the bottom line) includes the 1-bit sync-header (m) followed by 8-bits of encoded data, which is designated as 1a. The $2^{nd}$ section of this line of the elastic store stores a don't-care bit (x) followed by 8-bits of encoded data, which is designated as 1b.

The scramble module 132 in this example sequentially receives the 8-bits of the encoded data stored in the first and second sections of elastic storage and outputs an 8-bit scrambled value. As shown, the $1^{st}$ 8-bits that the scramble module 132 receives corresponds to the 1a portion of the $1^{st}$ code word stored in the elastic storage. Scramble module 132 scrambles these 8-bits to produce 8-bits of a scrambled code word, which is designated as SC-1a. The square bracketed values following the designation of SC-1a correspond to bit numbers of the 8-bits of the scrambled code word. The scramble module 132 continues to scramble 8-bits of the received data per scrambling interval, which may include one or more clock cycles. The resulting scrambled contents provide 16-bit scrambled code words, where a first portion of the 16-bit scrambled code word is one line and the second portion of the 16-bit scrambled code word is on the next line.

The framing module 134 receives, per scrambling interval, 9-bits of information from the elastic storage buffer and the 8-bits scrambled output from the scramble module 132. The framing module 134 functions to preserve the 1-bit sync-header (m) and scrambles at least a portion of the remaining 8-bits of encoded data it receives from the elastic storage buffer. During the $1^{st}$ scrambling interval, the framing module 134 outputs 8-bits of data as shown in the bottom line of the 17-bit transmit code words, which are transmitted 1-byte-per-cycle. As such, the framing module 134, based on the scrambled inputs from the scramble module 132 and the 9-bits from the elastic storage, outputs the 1-bit sync-header followed by 7-bits of a scrambled code word produced by the framing module 134 corresponding to scrambling of the 1a inputted code word section. As such, the designation FM-1a [0,6] corresponds to 7 scrambled bits of the input 1a produced by framing module 134. Accordingly, the $1^{st}$ portion of the $1^{st}$ code word 1a is not completely represented in the $1^{st}$ line outputted by the framing module 134. The framing module 134 outputs the remaining 7th scrambled bit produced by the scrambling module 132, which is designated SC-1a [7], during the next scrambling interval. The remaining portion of the $2^{nd}$ interval output of framing module 134 corresponds to the scrambling performed by the framing module on 7-bits of the $2^{nd}$ portion (1b) of the $1^{st}$ code word.

As shown, during the $2^{nd}$ output interval of framing module 134 only 7-bits are outputted that correspond to the $2^{nd}$ portion (1b) of the $1^{st}$ code word. Thus, on the $3^{rd}$ output interval of framing module 134, it first outputs the remaining bit of the $2^{nd}$ portion of the $1^{st}$ code word that was produced by scrambling module 132, which is designated SC-1b[7]. The framing module then outputs the sync-header for the $2^{nd}$ code word stored in the elastic storage. In the same interval, the framing module 134 outputs 6 scrambled bits of the $1^{st}$ portion of the $2^{nd}$ code word it produces, which is designated as FM-2a[0,5].

At this point, only 6 of the 8 bits have been outputted for the scrambling of the $1^{st}$ portion of the $2^{nd}$ code word. Thus, on the $4^{th}$ output interval, the framing module 134 begins by outputting bits 6 and 7 of the $1^{st}$ portion of the $2^{nd}$ code word produced by the scramble module 132, which is designated SC-2a[6,7]. The remaining output during the $4^{th}$ interval corresponds to the scrambling of 6-bits produced of the $2^{nd}$ portion of the $2^{nd}$ code word produced the by framing module 134, which is designated FM-2b[0,5].

During the $5^{th}$ output interval, the framing module 134 first outputs the remaining 2 bits of the scrambling of the $2^{nd}$ portion of the $2^{nd}$ code word produced by scrambling module 132, which is designated SC-2b[6,7]. The framing module 134 then outputs the 1-bit sync-header for the $3^{rd}$ code word m followed by 5-bits of scrambled code word of the $1^{st}$ portion of the $3^{rd}$ code word produced by framing module 134, which is designated FM-3a[0,4].

During the $6^{th}$ output interval, the framing module 134 first outputs the remaining 3-bits of the scrambling of the $1^{st}$ portion of the $3^{rd}$ code word as produced by scrambling module 132, which is designated SC-3a[5,7]. The framing module 134 also outputs 5-bits of the scrambling it produces regarding the scrambling of the $2^{nd}$ portion of the $3^{rd}$ code word, which is designated FM-3b[4,0].

As can be seen over the next intervals 7-15, the framing module 134 outputs one less bit of the scrambled code word it produces every two intervals and one more bit from the scrambled module every two intervals. At output cycle 16 of framing module 134, the offset shifting of the output of the framing module has looped completely around such that the framing module 134 during output cycle 16 outputs the scrambled code word produced by scrambling module 132, which is designated SC-8a[0,7]. Similarly, for output cycle 17, the framing module 134 outputs the scrambled code word portion produced by scrambling module 132, which is designated SC-8b[0,7].

To maintain alignment of the outputting of the scramble module 132 with the outputting of framing module 134, the scrambling module 132 slips, or skips an output interval every 16 intervals to maintain alignment with the outputting of framing module 134. The slipping results because the framing module 134 needs to output 17 bits of code word per two intervals while the scramble module only outputs 16 bits of code words per two intervals. Thus, every 16 intervals of outputting a 17-bit code word, requires the outputting by the scrambling module 132 to slip one cycle.

By slipping, or skipping, an interval, as shown at output interval 17, the process of outputting the 17-bit code words by the framing module is repeated at output interval 18, which has the same output bit pattern as output interval 1.

Figure 7:
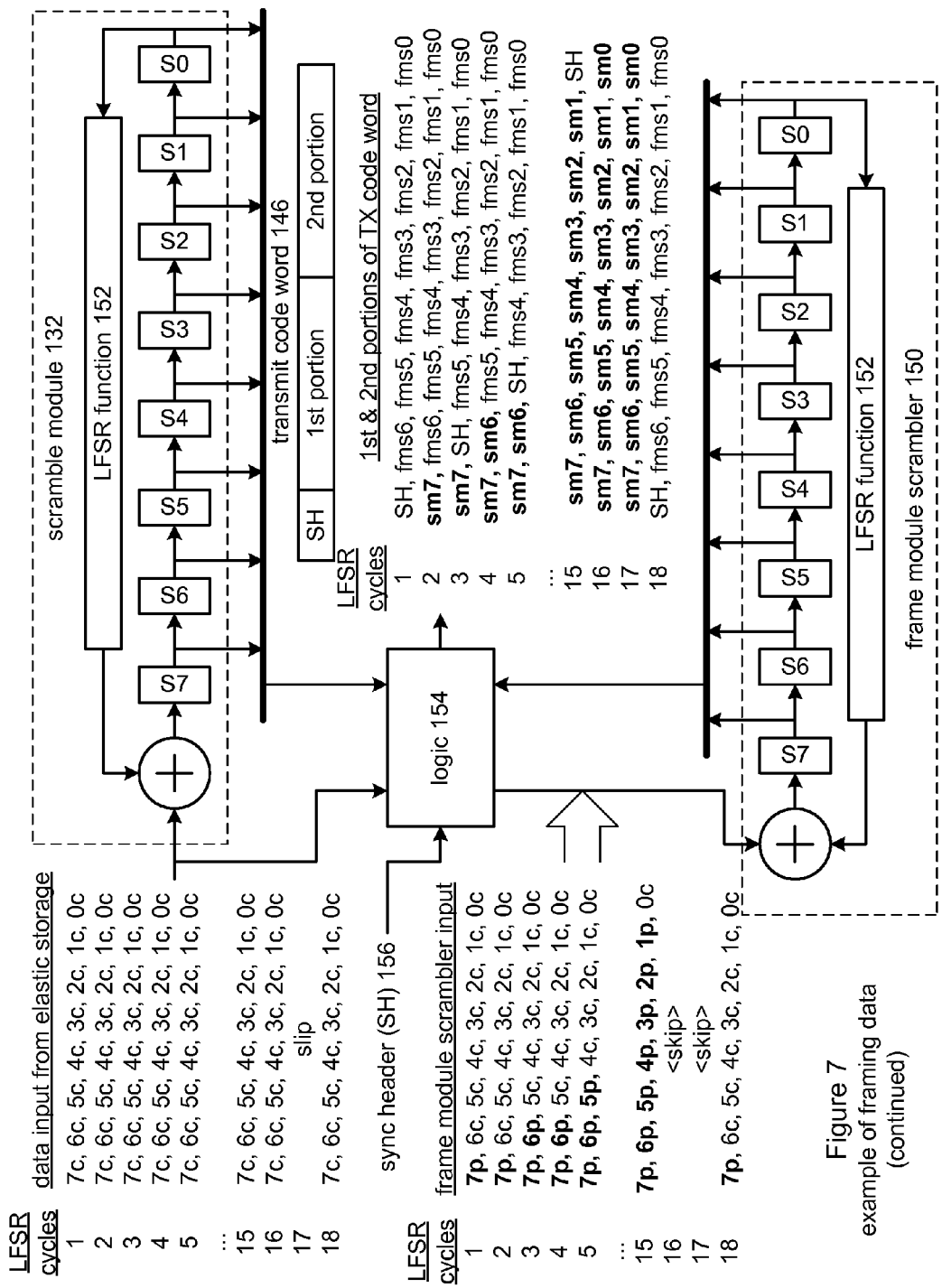
FIG. 7 is a continuation of the FIG. 6 example of framing data in accordance with the present invention.

As one of average skill in the art will appreciate, the example of FIG. 6 may be extended to a N-bit/N+m bit encoding system where the shift offset is in a value ranging from 1 to N/2m. In an embodiment, N may be equal to 64. As one of average skill in the art will also appreciate, during the $1^{st}$ two intervals, which corresponds to the shift offset having a value of 1, the framing module 134 outputs bits 0 through N/2-(m*k)-1 bits of the N-bit shifted code word. Thus, for intervals 1 and 2, where the shift offset k is 1, the framing module 134 outputs bits 0-6 of the $1^{st}$ code word where N is 16, m is 1 and k is 1. Continuing with the example, during the $3^{rd}$ and $4^{th}$ output cycles, where the shift offset is 2, the framing module outputs 6 bits of information (e.g., bits 0-5). FIG. 7 continues the example of framing data and as shown in FIG. 6 and further illustrates details of scrambling module 132 and framing module 134. The framing module 134 includes logic circuitry 154 and framing module scrambler 150. The framing module scrambler 150 is a linear feedback shift register (LFSR) and has a corresponding LFSR function 152. For example, the LFSR function may be implemented as a generating polynomial, which for 64b/66b is $G(x)=1+X^{39}+X^{58}$. The scrambling module 132 includes an identical LFSR structure to that of the framing module scrambler.

The scrambling module 132 receives data inputs from the elastic storage device. In this example, it receives 8 bits of a code word per LFSR cycle. As shown, the LFSR cycles are listed as 1-18. During the first LFSR cycle, the scramble module 132 receives 8 bits of a first portion of a first code word. During the second LFSR cycle, the scramble module 132 receives 8 bits of the second portion of the first code word. Accordingly, the scramble module 132 receives the first portion of a code word during odd numbered LFSR cycles and receives the second portion of the code word during the even numbered LFSR cycles. Each portion of a code word in this example includes 8-bits, which are designated [0c-7c]. The lower case C indicates that the data being received is current for this particular LFSR cycle.

For each LFSR cycle, the scrambling module 132 executes the LFSR function 152 on the current 8 bits of a code word to produce a scrambled code word as illustrated in FIG. 6. Thus, during the $1^{st}$ LFSR cycle the scrambling module 132 outputs the scrambled code word, which in FIG. 6, has the designation of SC-1a[0,7].

The logic circuitry 154 is operably coupled to receive the current scrambled code word produced by the scramble module 132 and to provide an 8-bit input to the framing module scramble 150. The logic circuitry 154 is also operably coupled to provide the output of the framing module 134. The logic circuitry 154 is also operably coupled to receive the sync-header 156 from the elastic storage device and to provide it at the appropriate time and in the appropriate location of the transmit code word 146.

As previously discussed in FIG. 6, the framing module 134 uses at least a portion of the scrambled resultant produced by scramble module 132 to produce the resultant transmit code word 146. To maintain alignment of the scrambling of data, the logic circuit 154 utilizes the previous input from the elastic store and/or a previous output of the scrambling module in a corresponding bit position as part of the input to the frame module scrambler 150. For instance, during the $1^{st}$ LFSR cycle, the logic 154 selects the $7^{th}$ bit from a previous code word inputted to, or outputted from, the scramble module 132 in bit position 7 of the frame module scrambler input, which is designated as 7p. The remaining bits of frame module scrambler input are the 7 current bits of the data input from the elastic store, which are designated 0c-6c. As such, the frame module scrambler 150 is scrambling 8-bits, 1 from a previous input or output of scramble module 132 and the remaining 7 bits from the current input from the elastic storage device. The same bit pattern is repeated for cycle 2.

During the $1^{st}$ LFSR cycle, the logic 154 outputs part of the $1^{st}$ portion of the transmit code word 146 and the sync-header (SH). As shown, the output includes the sync header followed by 7 bits of scrambled data produced by the frame module scrambler 150, which are designated fms6-fms0. During the $2^{nd}$ LFSR cycle, the logic 154 utilizes a previous bit outputted by the scramble module 132, which is designated as sm7, and 7 bits outputted by the frame module scrambler 150 to produce the next scrambled output. At this point, the code word 146 is 1-bit short of being complete. This bit is outputted during the $3^{rd}$ LFSR cycle.

During the $3^{rd}$ LFSR cycle, while the scramble module receives all 8-bits of the current input, the frame module scrambler only receives 6 of the current 8 bits, 5c-0c and receives bits 6 and 7 from the previous input or output of scramble module 132. The same input pattern occurs with respect to the $4^{th}$ LFSR cycle. Also, the $3^{rd}$ LFSR cycle, the logic 154 outputs the sync header for the $2^{nd}$ code word, and 6 bits of scrambled data produced by the frame module scrambler 150. Note that the 6 bits of the scrambled data produced by the frame module scrambler correspond to the 6 bits of the current input being received by the frame module scrambler 150.

Accordingly, the input bits having a "p" designation to the frame module scrambler act as place holders such that the frame module scrambler is effectively adjusted to scramble only the bits of the current input code word portion. The scrambling by the frame module scrambler continues as shown for LFSR cycles 4-14.

At the $15^{th}$ LFSR cycle, the $1^{st}$ portion of an $8^{th}$ code word is inputted to the scramble module 132 and a portion of that input is provided to the framing module 150. As shown during the $15^{th}$ cycle, the frame module scrambler input has 7 of the 8 bits coming from the previous input and/or output of scramble module 132 and only 1 bit, bit position 0, coming from the current data input from the elastic storage device. The resulting output for cycle 15 has 7 bits corresponding to the previously scrambled output of scramble module 132 and 1-bit of sync-header. On the $16^{th}$ and $17^{th}$ cycles, the frame module scrambler receives no input and the entire output for cycles 16 and 17 are produced by scramble module 132. As also shown, the $17^{th}$ cycle input to the scramble module 132 is skipped to realign the inputting of data into the scrambling module and the frame module scrambler.

FIG. 8 is a logic diagram of framing decoded data. The framing apparatus includes the descramble module 88 that includes a scrambling module 132 and framing module 134, elastic storage buffer 92 and an Nb/(N+m)b decoder 98. In general, the descramble module 88 receives a receive code word 160 that includes a sync-header, a $1^{st}$ portion and a $2^{nd}$ portion. The descramble module 88 descrambles the data, which is provided to the elastic storage buffer 92. The elastic storage buffer 92 provides, during each processing interval, the Nb/(N+m)b decoder with m+N/2 bits of data. The decoder performs an inverse function of the encoder (as was described in connection with FIGS. 5-7).

As indicated, the scramble function and descramble function are identical to the framing of encoded data. In essence, the scramble function is multiplying one code word with a subsequent code word to produce the next code word. As is generally known in the coding art, code words are unique values and have the properties that one code word multiplied, using finite field arithmetic, with another code word yields a third code word or the same code word. For example, 0 is one valid code word, thus any code word multiplied with 0 results in that same code word. Further, code word 1 multiplied with code word 2 equals code word 3. Similarly, code word 3 multiplied with code word 2 equals code word 1. Based on this principle, the scrambling process is one ordered finite field multiplication of code words, for example code word 1 multiplied with code word 2 to produce code word 3, and the descrambling process is a reverse ordered finite field multiplication of codes words, for example, code word 3 multiplied with code word 2 equals code word 1. Thus, by performing the finite field mathematics in reverse order of the scrambling function, the descrambling function is obtained. Accordingly, the same concepts for the scrambling or framing of data as indicated in FIGS. 5 and 6 apply to the descrambling and/or deframing of data by the descramble module 88 of FIG. 8.

Figure 9:
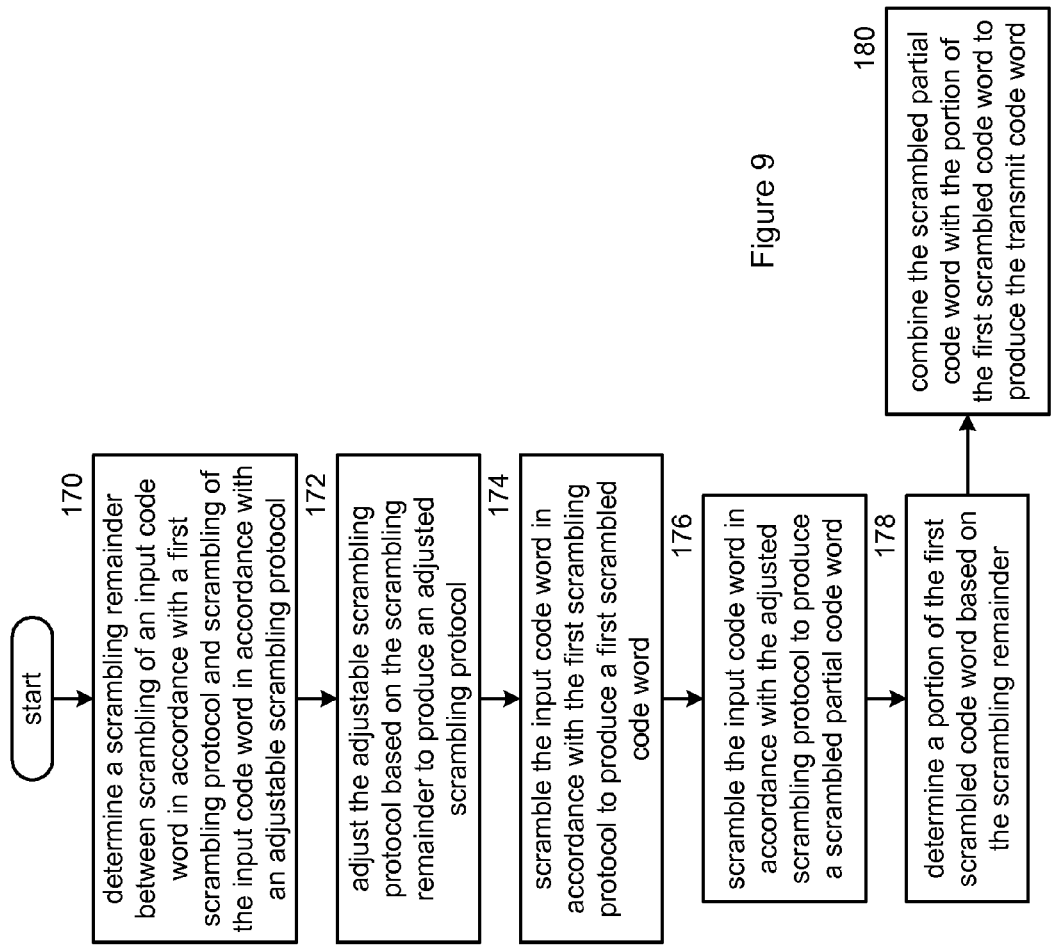
FIG. 9 is a logic diagram of a method for framing transmit encoded output data in accordance with the present invention.

The programmable receive PCS module 44 of FIG. 3 and/or the programmable transmit PCS module 42 of FIG. 4 may perform the method for framing data as shown in FIG. 9. The process begins at Step 170 where a scrambling remainder between scrambling of an input code word in accordance with a $1^{st}$ scrambling protocol and scrambling of the input code word in accordance with an adjustable scrambling protocol is determined. The scrambling remainder corresponds to the number of bits being used from the scramble module to complete the scrambling of a code word. With reference to FIG. 6, the scrambling remainder for cycles 2 and 3 is 1, the scrambling remainder for cycles 4 and 5 is 2, et cetera.

Further, the scrambling remainder may be determined based on a current modulo count for the scrambling of the input code word in accordance with the $1^{st}$ scrambling protocol and is based on the bit size difference between the transmit encoded output and the $1^{st}$ scrambled code word. This was illustrated and discussed with reference to FIGS. 6 and 7. The $1^{st}$ scrambling protocol and the adjustable scrambling protocol may be implemented as a linear feedback shift register that implements one or more generator polynomials. In one embodiment, the adjustable scrambling protocol is based on the generator polynomial of the $1^{st}$ scrambling protocol where a number of stages in the linear feedback shift register are determined based on the scrambling remainder.

The process then proceeds to Step 172 where the adjustable scrambling protocol is adjusted based on the scrambling remainder to produce an adjusted scrambling protocol. This was illustrated in FIG. 7 where the input to the frame module scrambler is adjusted. The process then proceeds to Step 174 where the input code word is scrambled in accordance with the $1^{st}$ scramble protocol to produce a $1^{st}$ scrambled code word. With reference to FIGS. 6 and 7, the $1^{st}$ scrambling protocol corresponds to the scrambling of the input code word by the scrambling module 132.

The process then proceeds to Step 176 where the input code word is scrambled in accordance with the adjusted protocol to produce a scrambled partial code word. This corresponds to the scrambling performed by the frame module scrambler 150 of FIGS. 6 and/or 7. Note that at cycle 15, 16 and 17, the pattern begins to rollover with respect to the scrambling. As such, when a rollover condition exists, as at cycle 16 and/or 17 the scrambling by the frame module scrambler 150 is not utilized and the resulting outputted scrambled word is produced by scramble module 132. Once the rollover is complete, the pattern repeats as in accordance with cycle 1. As an alternate approach to adjusting the scrambled protocol, the frame module scrambler 150 may have shift stages (i.e., S0-S7 in FIG. 7) removed based on the scrambling remainder such that the LFSR function 152 is adjusted.

The process then proceeds to Step 178 where a portion of the 1$^{st}$ scrambled word is determined based on the scrambling remainder. The portion corresponds to the particular LFSR cycle, as shown in FIG. 7, being implemented. During cycles 2 and 3 the scrambling remainder is 1, during cycles 4 and 5 the scrambling remainder is 2, et cetera. As such, based on this scrambling remainder, the portion of the scrambled resultant produced by scrambling module 132 is used. The process then proceeds to Step 180 where the scrambled partial code word is combined with the portion of the 1$^{st}$ scrambled code word to produce the transmit code word. This is illustrated in FIGS. 6 and 7 as the output of the framing module 134.

Figure 10:
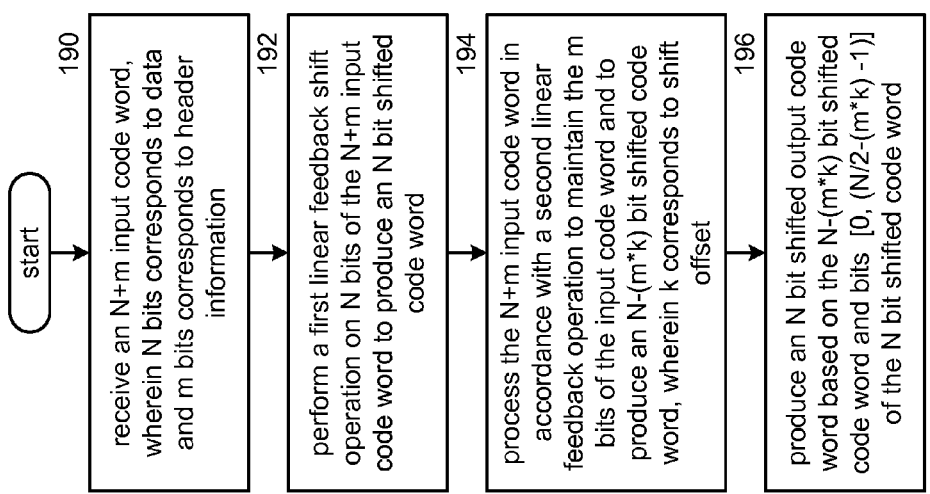
FIG. 10 is a logic diagram of a method for linear feedback shifting in accordance with the present invention.

FIG. 10 illustrates a logic diagram of linear feedback shifting that may be performed by the programmable receive PCS module 44 of FIG. 3 and/or the programmable transmit PCS module 42 of FIG. 4. The process begins at step 190 where an N+m input code word is received. N-bits of the input code word correspond to data and the m bits correspond to header information. For example, N may be 64 and m may be 2 for 64b/66b encoding. Note that the encoding may be extended to 64b/(64+X)b encoding where X is a value greater than 3.

The process then proceeds to step 192 where a first linear feedback shift operation is performed on N bits of the N+m input code word to produce an N bit shifted code word. The process then proceeds to step 194 where the N+m input code word is processed in accordance with a second linear feedback operation to maintain the m bits of the input code word and to produce an N-(m*k) bit shifted code word, wherein k corresponds to shift offset. The process then proceeds to Step 196 where an N-bit shifted output code word is based on the N-m*k bit shifted code word and bits [0,N/2-(m*k)-1)] of the N-bit shifted code word. This again was illustrated with reference to the examples of FIGS. 6 and 7.

The preceding discussion has presented a method and apparatus for framing transmit encoded data and linear feedback shifting. By utilizing the 1$^{st}$ scrambling protocol as may be implemented via the scramble module 132 and an adjustable scrambling protocol as implemented by the frame module 134, scrambling and descrambling of code words is achieved without the need for a barrel shifter, which reduces die area and power consumption. As one of average skill in the art will appreciate, other embodiments may be derived from the teaching of the present invention without deviating from the scope of the claims.

What is claimed is:

1. A linear feedback shifting module comprising:
a receiving module operably coupled to receive an N+m bit input code word, wherein N bits of the N+m bit input code word corresponds to data and m bits of the N+m bit input code word corresponds to header information of the N+m bit input code word;
a linear feedback shift register operably coupled to perform a first linear feedback shift operation on N bits of the N+m bit input code word to produce an N bit shifted code word;
an adjustable linear feedback shift register operably coupled to:
process the N+m bit input code word in accordance with a second linear feedback operation to maintain the m bits of the input code word and to produce an N-(m*k) bit shifted code word, wherein k corresponds to shift offset; and
produce an N bit shifted output code word based on the N-(m*k) bit shifted code word and bits [0, (N/2-(m*k)-1)] of the N bit shifted code word.

2. The linear feedback shifting module of claim 1, wherein the shift offset (k) further comprises an integer value in a range of 1 to N/2m.

3. The linear feedback shifting module of claim 1, wherein the N+m bit input code word further comprises a 64b/66b encoded word.

4. The linear feedback shifting module of claim 3, wherein the N bit shifted output code word further comprises a scrambled representation of the 64b/66b encoded word.

5. The linear feedback shifting module of claim 3, wherein the first linear feedback shift operation further comprises a finite field multiplication of N bits of the N+m bit input code word with a previously produced N bit shifted output code word.

6. The linear feedback shifting module of claim 4, wherein the second linear feedback operation further comprises a finite field multiplication of a portion of the N bits of the N+m bit input code word with a previously produced N bit shifted output code word.

7. The linear feedback shifting module of claim 3, wherein the N bit shifted output code word further comprises a descrambled representation of the 64b/66b encoded word.

8. The linear feedback shifting module of claim 7, wherein the first linear feedback shift operation further comprises a finite field multiplication of N bits of the N+m bit input code word with a previously produced N bit shifted output code word.

9. The linear feedback shifting module of claim 7, wherein the second linear feedback operation further comprises a finite field multiplication of a portion of the N bits of the N+m bit input code word with a previously produced N bit shifted output code word.

* * * * *